(12) United States Patent
Lee et al.

(10) Patent No.: US 11,487,062 B2
(45) Date of Patent: Nov. 1, 2022

(54) FIELD ASSEMBLY OPTICAL CONNECTOR CONFIGURED TO PREVENT OPTICAL FIBER BENDING

(71) Applicant: SOLTECH INFONET CO., LTD., Seoul (KR)

(72) Inventors: Hae Jin Lee, Seoul (KR); Byung Chul Park, Gunpo-si (KR)

(73) Assignee: SOLTECH INFONET CO., LTD., Seoul (KR)

( * ) Notice: Subject to any disclaimer, the term of this patent is extended or adjusted under 35 U.S.C. 154(b) by 0 days.

(21) Appl. No.: 17/299,776

(22) PCT Filed: Dec. 9, 2019

(86) PCT No.: PCT/KR2019/017285
§ 371 (c)(1),
(2) Date: Jun. 3, 2021

(87) PCT Pub. No.: WO2020/117023
PCT Pub. Date: Jun. 11, 2020

(65) Prior Publication Data
US 2022/0019026 A1 Jan. 20, 2022

(30) Foreign Application Priority Data
Dec. 7, 2018 (KR) .......................... 10-2018-0157520

(51) Int. Cl.
*G02B 6/255* (2006.01)
(52) U.S. Cl.
CPC .................................. *G02B 6/2555* (2013.01)
(58) Field of Classification Search
CPC ............................. G02B 6/2555; G02B 6/3803
See application file for complete search history.

(56) References Cited

U.S. PATENT DOCUMENTS 8,596,883 B2 * 12/2013 Taira .................... G02B 6/3849
385/78

FOREIGN PATENT DOCUMENTS

| JP | 2005-265975 A | 9/2005 |
|---|---|---|
| JP | 2012-230266 A | 11/2012 |
| KR | 10-0724076 B1 | 6/2007 |
| KR | 10-2010-0089709 A | 8/2010 |
| KR | 10-1051119 B1 | 7/2011 |
| KR | 10-1492611 B1 | 2/2015 |
| KR | 10-2017-0047462 A | 5/2017 |

OTHER PUBLICATIONS

International Search Report in International Application No. PCT/KR2019/017285, dated Mar. 26, 2020, 2pages.

* cited by examiner

*Primary Examiner* — Omar R Rojas
(74) *Attorney, Agent, or Firm* — Park, Kim & Suh, LLC (57) ABSTRACT

A field-assembly optical connector includes an inner sleeve module, a connector frame housing the inner sleeve module, and a cable boot coupled to the inner sleeve module to protect a sheath of an optical fiber. The inner sleeve module includes a sleeve body having a sleeve, an intermediate connector fitted on the sleeve body and having protrusions, a spring fitted on a threaded portion of the sleeve body, a fixing ring screwed to the threaded portion of the sleeve body, and a ferrule stub inserted into the sleeve body through the fixing ring. A cable boot is fixed to the sleeve body and is coupled to the intermediate connector to be moveable within a predetermined range.

6 Claims, 10 Drawing Sheets

FIELD ASSEMBLY OPTICAL CONNECTOR CONFIGURED TO PREVENT OPTICAL FIBER BENDING

CROSS-REFERENCE TO RELATED APPLICATIONS

This application is the National Stage filing under 35 U.S.C. 371 of International Application No. PCT/KR2019/017285, filed on Dec. 9, 2019, which claims the benefit of Korean Patent Application No. 10-2018-0157520, filed on Dec. 7, 2018, the contents of which are all hereby incorporated by reference herein in their entirety.

TECHNICAL FIELD

The present invention relates to an optical connection technology, and particularly, to a field-assembled optical connector that prevents bending phenomenon in which an optical fiber is bent when an optical connector is assembled using an adapter.

BACKGROUND ART

In general, optical fibers (or optical cables) transmit optical signals and, unlike metal wires that transmit electric signals, can transmit large amounts of information at extremely high speed without loss.

Methods of connecting the optical fibers include fusion splicing and connector splicing).

The fusion splicing is to connect two optical fibers permanently or semi-permanently by aligning the two optical fibers and then fusing the aligned optical fibers with an optical fusion splicer, and the connector splicing is to adhere and fix optical fibers to precision-processed ferrules in advance and then abut and fix the facing ferrules to each other using an adapter. The fusion splicing cannot be replaced after splicing, but the connector splicing has the advantage of being freely replaced.

An optical connector for the connector splicing is an element that connects optical fibers in an optical path, and conventionally, the optical connector, which physically brings into contact with both ends of the optical fibers by aligning and tightly fixing each optical fiber in a central through hole of a ferrule made of ceramic, glass, and so on, was used.

Typical types of the optical connectors that are currently used, include Lucent Connector (LC), Subscriber Connector or Square Connector (SC), Straight Tip (ST), Fiber Transmission System Connector (FC), Mechanical Transferable Registered Jack (MTRJ) and the like, depending on a shape of the connector.

Meanwhile, a field-assembled optical connector is designed to be easily assembled in the field (or on site), and is disclosed in KR Patent No. 10-1051119 (Field installable optical fiber connector), and KR Patent No. 10-0724076 (Field installable optical fiber connector), KR Patent Application Publication No. 10-2010-0089709 (Optical connector for assembling in the field), and KR Patent No. 10-1492611 (Field installable optical connector).

The field-assembled optical connector employs a method of maintaining tension by directly connecting a connector frame and a cable boot to reinforce the tension of the connector and a sheath of an optical cable. Particularly, in order to align the optical fiber in the process of coupling the optical fiber, the field-assembled optical connector has a V-shaped groove or a protection sleeve for a connection point, which secures the optical cable to the cable boot to protect the optical cable from the extreme tension.

Figure 1:
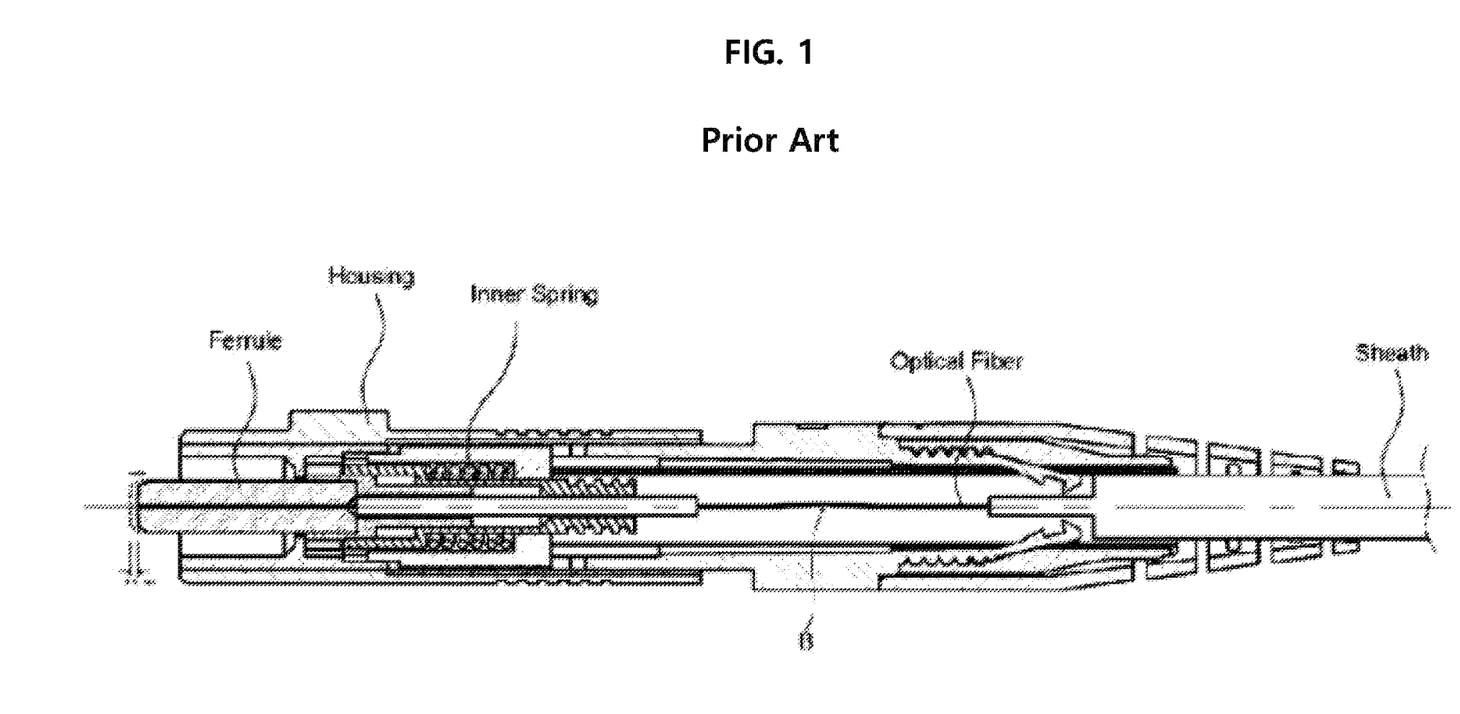
FIG. 1 is a cross-sectional view for explaining bending phenomenon occurring in a conventional optical connector.
Figure 2:
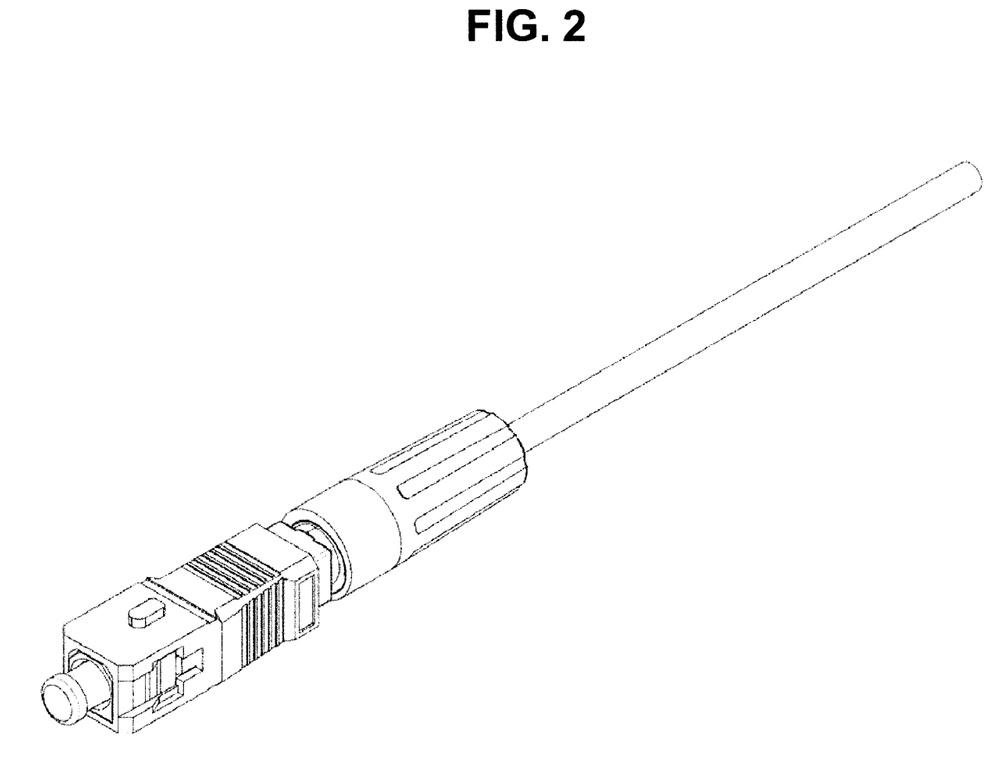
FIGS. 2 to 9 are diagrams showing exploded and coupled structures of a field-assembled optical connector that prevents bending of an optical fiber according to the present invention.
Figure 3:
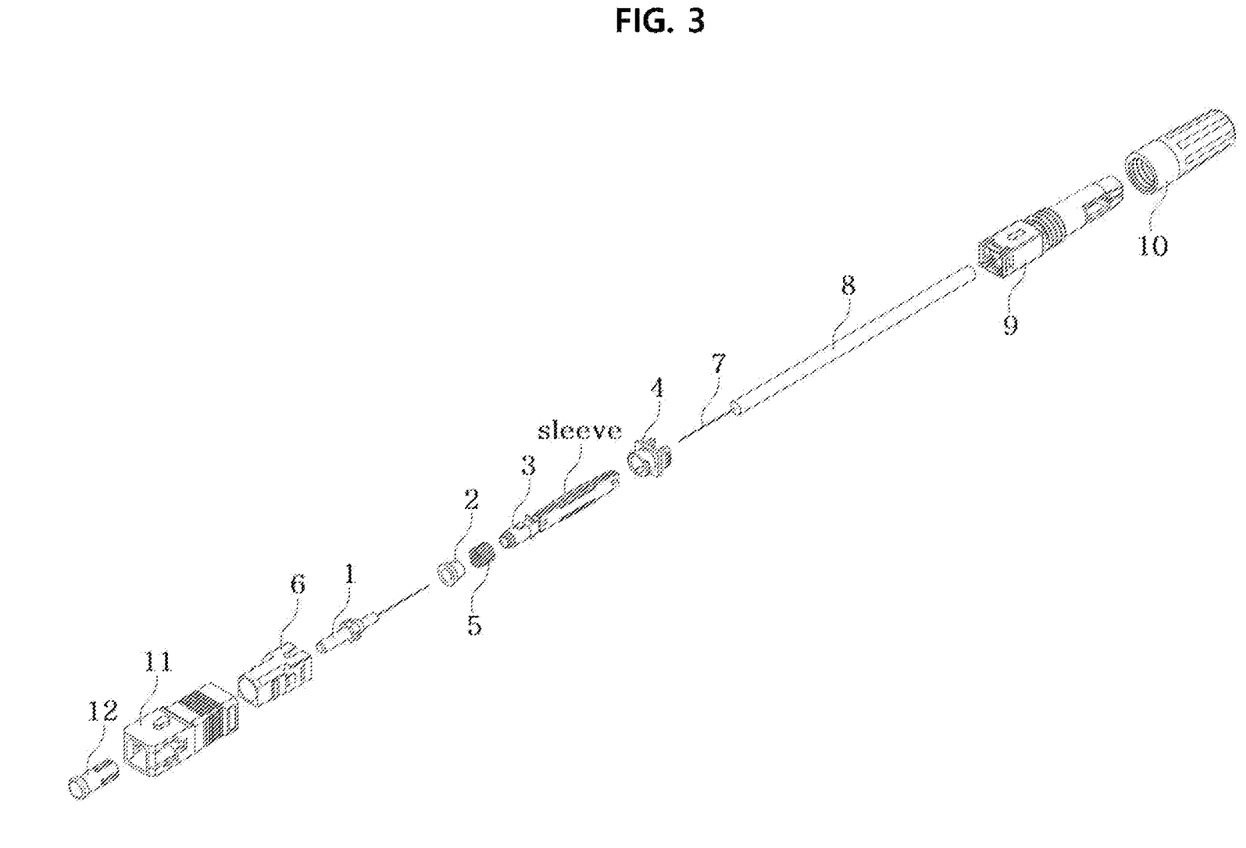
Figure 4:
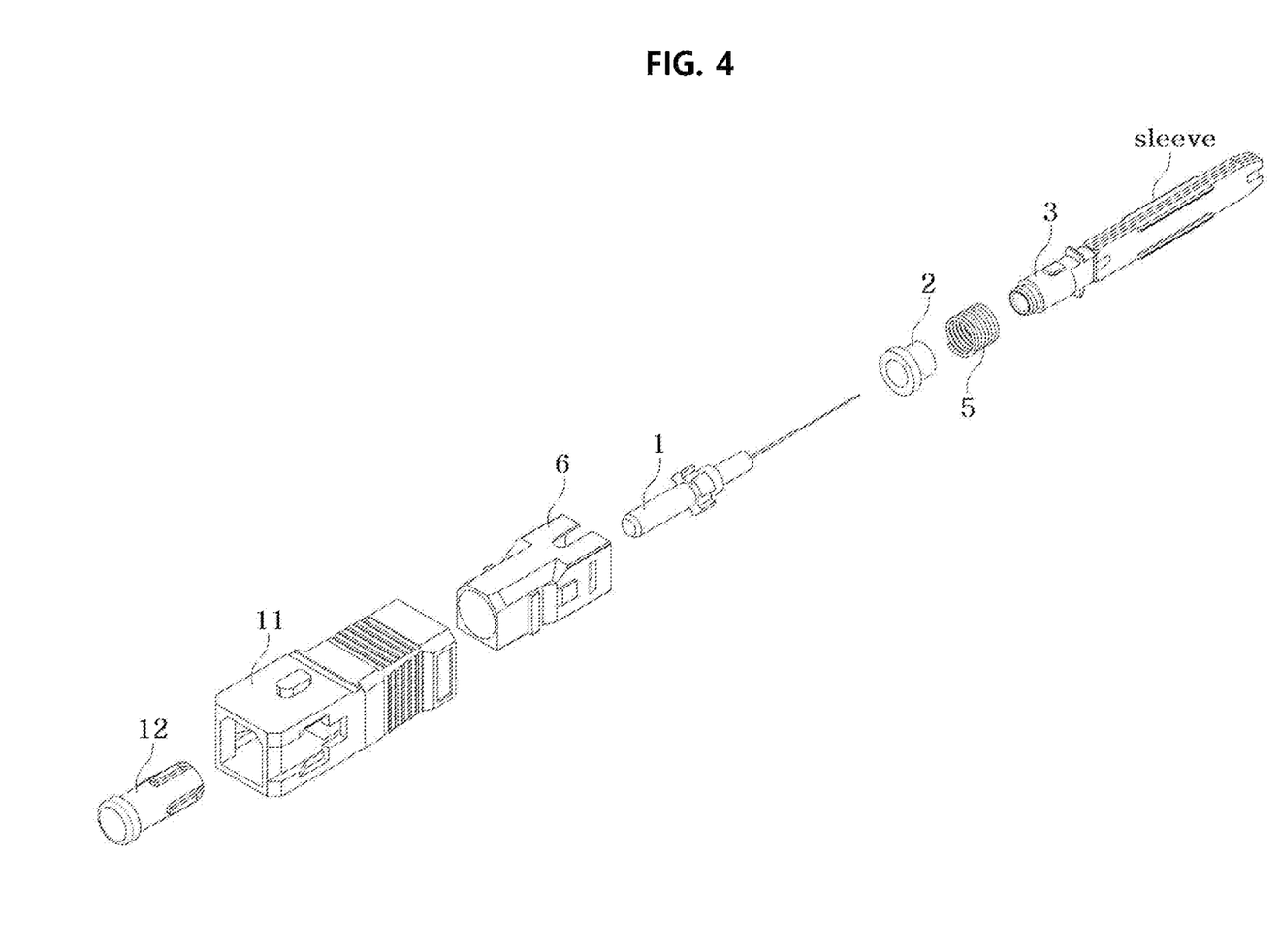
Figure 5:
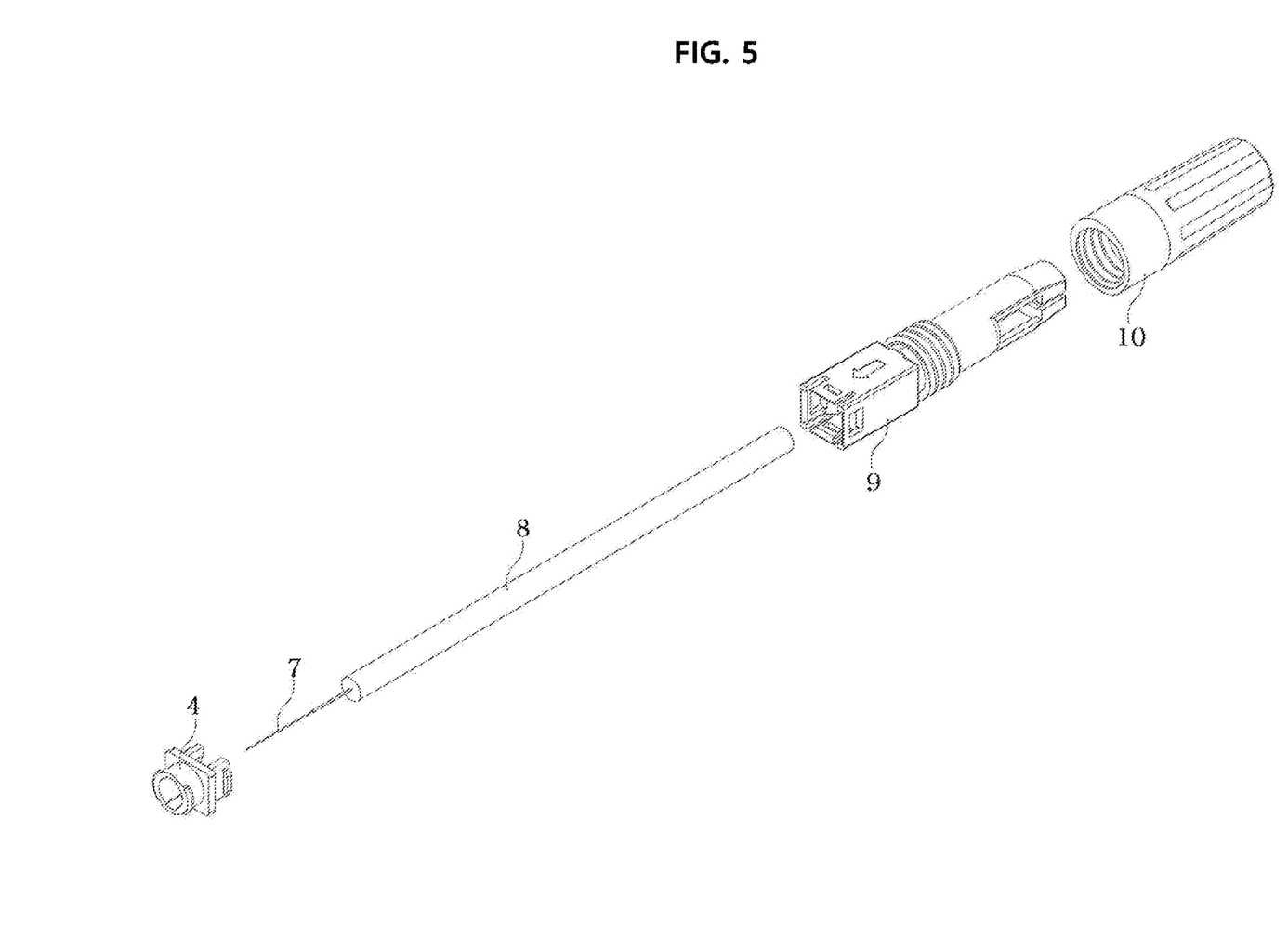
Figure 6:
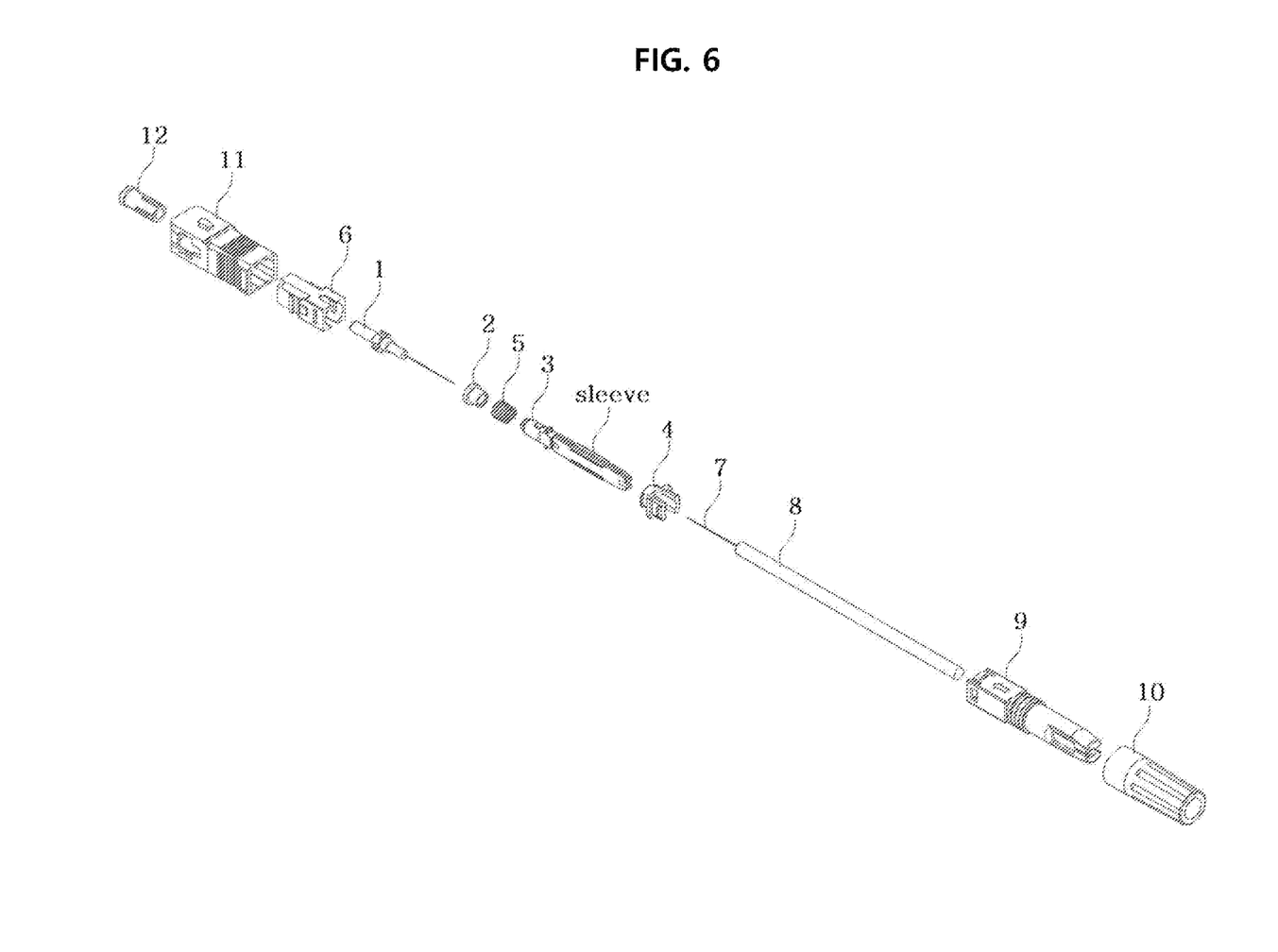
Figure 7:
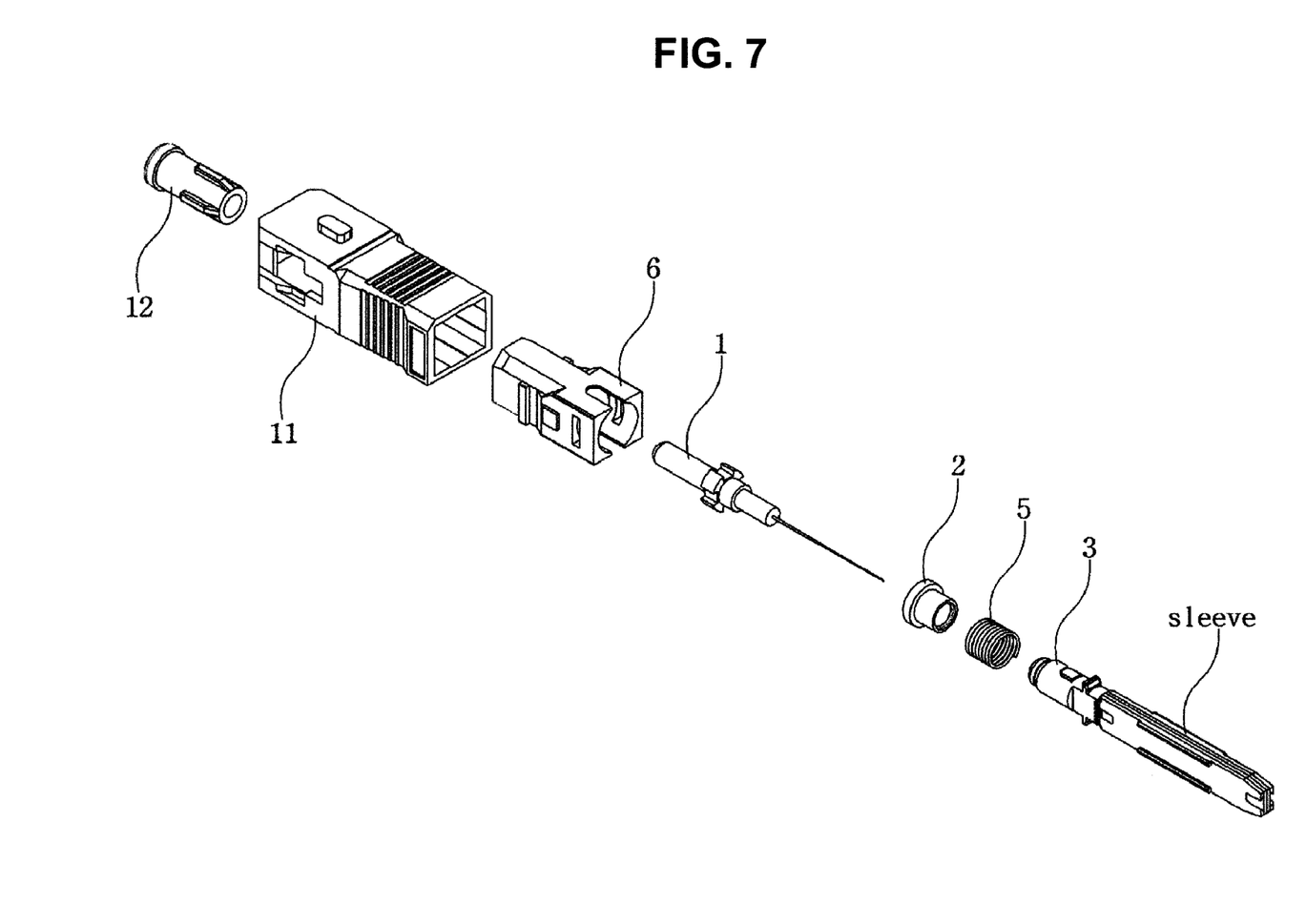
Figure 8:
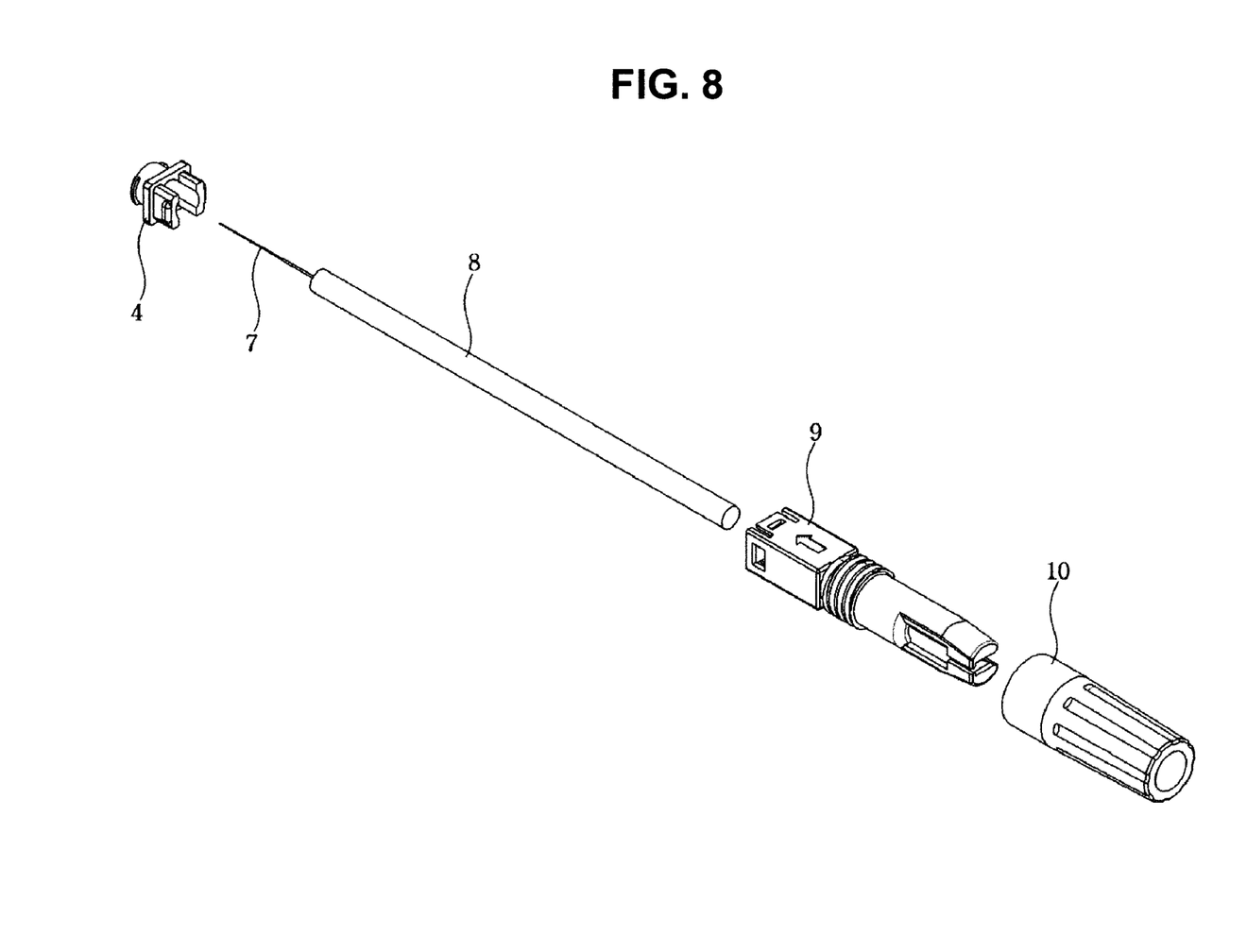
Figure 9:
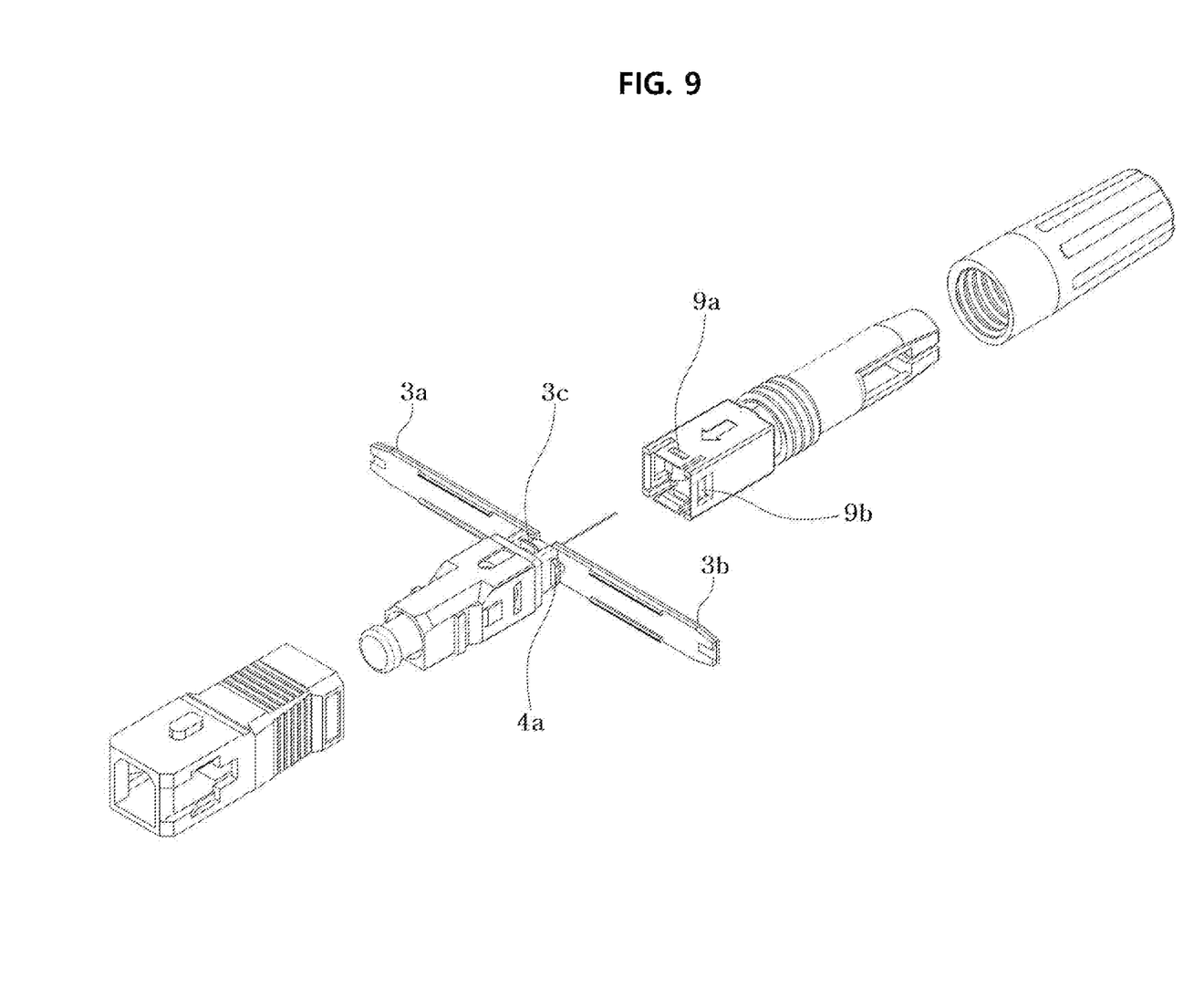
Figure 10:
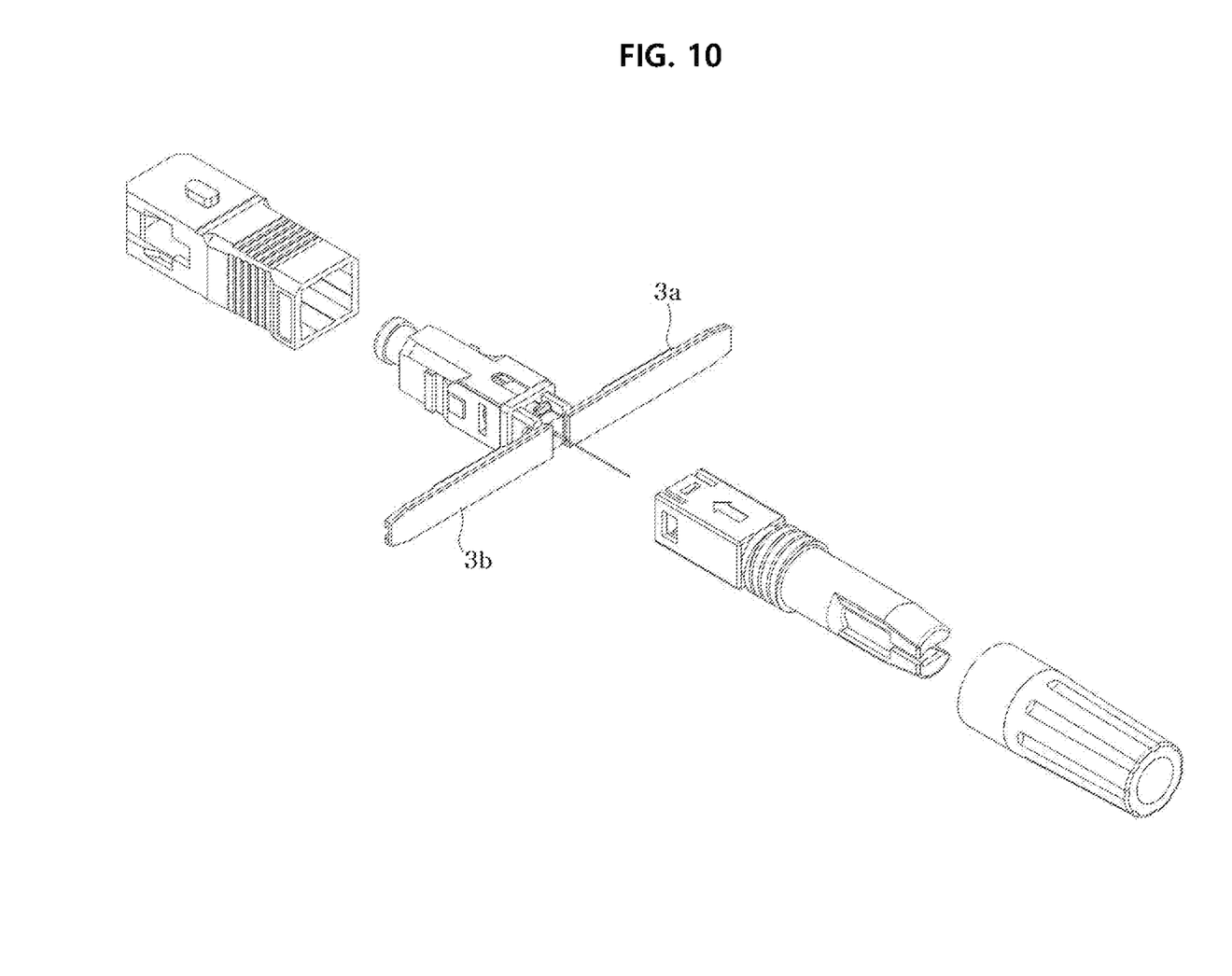

FIG. 1 shows an example of an optical connector according to the prior art.

As shown in FIG. 1, when two optical connectors are coupled using an adapter, since ferrules are pushed to each other on a splicing surface of an optical fiber at the front and a cable sheath at the rear is fixed to a cable boot, the optical fiber is pushed back about 0.5 to 1 mm in both directions as much as the ferrules are pushed at the splicing surface, and bending phenomenon in which the optical fiber is bent at a point B, occurs.

The bending phenomenon of the optical fiber not only causes loss of light transmission, but also causes the optical connector to be completely useless by generating cracks in the optical fiber, when bending continues for a long period of time.

DISCLOSURE

Technical Problem

The object of the present disclosure is implemented in view of problems mentioned above, and is to provide a field-assembled optical connector that prevents an optical fiber in the optical connector from being bent although ferrules are pushed to each other on a splicing surface of the optical fiber while two optical connectors are coupled using an adapter.

Technical Solution

To achieve the above object, a field-assembled optical connector preventing bending of an optical fiber according to the present invention, comprises: an inner sleeve module; a connector frame 6 configured to house the inner sleeve module; and a cable boot 9 coupled to the inner sleeve module to protect a sheath of the optical fiber, wherein the inner sleeve module includes: a sleeve body 3 having a sleeve for aligning the optical fiber during optical fusion splicing, at one end thereof, and a threaded portion at the other end thereof; an intermediate connector 4 fitted on the sleeve body 3 while approaching toward a portion of the sleeve body to which the sleeve is provided, the intermediate connector having protrusions 4a at right and left surfaces thereof; a spring 5 fitted on the threaded portion of the sleeve body 3; a fixing ring 2 screwed to the threaded portion of the sleeve body 3 to prevent the spring 5 from disengaging from the sleeve body; and a ferrule stub 1 inserted into the sleeve body 3 through the fixing ring 2 to allow the optical fiber provided to the ferrule stub to extend to the sleeve of the sleeve body 3, and wherein the cable boot 9 is fixed to the sleeve body 3 and is coupled to the intermediate connector 4 to be movable within a predetermined range.

Preferably, one end of the connector frame 6 is coupled to the intermediate connector 4 by approaching from a portion of the sleeve body to which the ferrule stub 1 is provided, and a ferrule provided to the ferrule stub 1 is exposed from the other end of the connector frame.

Preferably, cable boot 9 includes: fixing holes 9a provided to upper and lower surfaces thereof or right and left surfaces thereof; and variable slots 9b provided to the upper and lower surface or the right and left surfaces which are different from surfaces to which the fixing holes 9a are provided, wherein the sleeve body 3 is fixed to the fixing holes 9a, and the intermediate connector 4 is movably coupled to the variable slots 9b.

More preferably, the sleeve body 3 includes first protrusions 3c fitted into the fixing holes 9a.

More preferably, the intermediate connector 4 includes second protrusions 4a fitted into the variable slots 9b, and each of the variable slots 9b comprises a hole having a size greater than a size of the second protrusion 4a to allow the second protrusion 4a to move in a front-rear direction.

Preferably, the field-assembled optical connector further comprises a boot cap 10 coupled to the cable boot 9 in a screw manner to fix a portion of the cable boot 9 fastened to the optical fiber.

Advantageous Effects

According to the present invention, an optical fiber in an optical connector is prevented from being bent although ferrules are pushed to each other on a splicing surface of the optical fiber while two optical connectors are coupled using an adapter. Therefore, loss of light transmission is removed, and breakage of the optical connector by bending phenomenon is prevented in advance.

BEST MODE

Other objects, features and advantages of the present invention will become apparent through the detailed description of embodiments with reference to accompanying drawings.

Hereinafter, the configuration and operation of the embodiments of the present invention will be described with reference to the accompanying drawings, the configuration and operation of the present invention shown in the drawings and described based on such drawings are described as at least one embodiment, and the technical concept and the essential configuration and operation of the present invention are not limited by such description.

Hereinafter, a preferred embodiment of a field-assembled optical connector for preventing bending of an optical fiber according to the present invention will be described in detail with reference to the accompanying drawings.

FIGS. 2 to 9 are diagrams showing exploded and coupled structures of a field-assembled optical connector that prevents bending of an optical fiber according to the present invention.

Referring to 2 to 9, the field-assembled optical connector according to the present invention comprises a ferrule stub 1, a fixing ring 2, a sleeve body 3, an intermediate connector 4, a spring 5, a connector frame 6, an optical fiber 7, a ferrule 8 receiving the optical fiber 7, a cable boot 9, a boot cap 10, a connector body 11, and a cap 12.

The intermediate connector 4 is coupled to the sleeve body 3. The sleeve body 3 has a sleeve at one end thereof for aligning the optical fiber during optical fusion splicing, and the intermediate connector 4 is coupled on the sleeve body 3 by approaching or entering toward a position to which the sleeve is coupled, with being penetrated by the sleeve and the sleeve body 3. The sleeve is for aligning the optical fiber in the field assembly process which uses the optical fusion splicer, and has a structure in which two wing portions 3a and 3b are coupled. The sleeve may be removed after the optical fusion splicing is completed.

The sleeve body 3 has a side portion which is flat, and the intermediate connector 4 is movably fitted on the flat side portion.

The other end of the sleeve body 3 is provided with a threaded portion, and has an outer diameter is smaller than that of one end thereof. The spring 5 having an inner diameter greater than an outer diameter of the threaded portion is fitted on the other end of the sleeve body 3, and the fixing ring 2 is screwed on the threaded portion of the sleeve body 3 to prevent the disengagement or separation of the spring 5.

An outer diameter of one end of the fixing ring 2, that is, a portion screwed to the threaded portion of the sleeve body 3 is formed smaller than the inner diameter of the spring 5, and the other end of the fixing ring 2 has a step portion greater than the inner diameter of the spring.

Accordingly, the threaded portion of the sleeve body 3 is inserted into one end of the spring 5, one end of the fixing ring 2 is inserted into the other end of the spring 5, and the spring 5 is pressed to some extent by the step portion of the fixing ring 2, while the fixing ring 2 is screwed to the threaded portion of the sleeve body 3.

As described above, in the present invention, the spring 5 is fixed between the sleeve body 3 and the fixing ring 2 while the fixing ring 2 is screwed to the sleeve body 3.

The ferrule stub 1 penetrates through the fixing ring 2 and is inserted into the sleeve body 3. The ferrule stub 1 has a middle portion for limiting an insertion depth during the insertion, and the middle portion has an outer diameter greater than an inner diameter of the fixing ring 2.

As the ferrule stub 1 is inserted into an interior of the sleeve body 3, an optical fiber provided in the ferrule stub 1 is preferably formed to extend to the sleeve of the sleeve body 3. This is to allow the optical fiber to be aligned by the sleeve when the optical fiber is spliced using the optical fusion splicer.

As such, with reference to the sleeve body 3, the ferrule stub 1 is fitted to one end of the sleeve body 3, the spring 5 is fixed to the other side of the sleeve body 3 by the fixing ring 2, and thereby an inner sleeve module of the optical connector is accomplished with the ferrule stub 1 coupled therein.

The connector frame 6 is configured to house the inner sleeve module, and one end thereof enters or approaches from a position to the ferrule stub 1 is provided, and is coupled to the intermediate connector 4. Then, a ferrule provided to the ferrule stub 1 is exposed from the other end of the connector frame 6.

As the connector frame 6 is coupled to the inner sleeve module, a connector head of the optical connector is accomplished.

In the field assembly process using the optical fusion splicer, the splicing is performed while the connector body 11 is disassembled from the connector head.

The above assembly structure has been described for a structure provided on one end with respect to an optical fusion splicing portion, and the optical fiber 7 to be optically spliced and the ferrule 8, the cable boot 9, and the boot cap 10 which receive such an optical fiber 7 are provided on the other end with respect to the optical fusion splicing portion.

The cable boot 9 and the boot cap 10 are configured to be assembled after the optical fusion splicing is completed. The cable boot 9 is fixed to the sleeve body 3 and is coupled to the intermediate connector 4 to be movable within a predetermined range.

The cable boot 9 is provided to protect a sheath of the optical cable and thus is preferably stiff. The cable boot 9 is provided with fixing holes 9a formed on upper and lower surfaces which are opposite to each other, respectively and variable slots 9b formed on left and right surfaces opposite to each other, respectively. The arrangement of the fixing holes 9a and the variable slots 9b are interchangeable.

The sleeve body 3 is fixed to the fixing hole 9a, and for this purpose, upper and lower surfaces of the sleeve body 3 are provided with first protrusions 3c fitted into the fixing holes 9a.

The intermediate connector 4 is movably coupled to the variable slot 9b, and for this purpose, second protrusions 4a fitted to the variable slots 9b are provided on left and right surfaces of the intermediate connector 4. In particular, each variable slot 9b preferably comprises a hole having a size greater than a size of the second protrusion 4a such that the second protrusion 4a is able to move in a front-rear (or back and forth) direction.

The variable slot 9b and the second protrusion 4a have a structure that allows the inner sleeve module to be movably coupled while the elastic force of the spring 5 is applied thereto. Accordingly, the inner sleeve module is pushed back at a predetermined interval based on a slot size of the variable slot 9b, and is limited to be pushed back no more based on the slot size of the variable slot 9b. Therefore, the variable slot 9b also serves as a stopper for limiting the movement over a certain level while allowing the movement by the elastic force of the spring 5

The boot cap 10 is coupled to the cable boot 9 in a screw manner to securely fix a portion of the cable boot 9 fastened to the optical fiber.

In the optical connector according to the present invention, although the ferrule stub 1 is pushed toward an opposite ferrule, i.e., the ferrule 8 provided through the cable boot 9, since the cable boot 9 is fixed to the sleeve body 3, but is movably coupled to the intermediate connector 4 to be spaced by the predetermined interval, the cable boot 9 is pushed back and the bending phenomenon of optical fiber in the optical connector does not occur.

Mode for Invention

Although the preferred embodiments of the present invention has been described in the above, those skilled in the art to which the present invention pertains may implement a modified form within the scope not departing from the essential characteristics of the present invention.

Therefore, the embodiments of the present invention described herein should be considered in a descriptive aspect rather than a restrictive aspect, the scope of the present invention is shown in the claims rather than the above description, and all differences within the scope equivalent thereto should be construed as being included in the present invention.

INDUSTRIAL APPLICABILITY

The present invention may be used for an optical connector that assembles the optical connector using an adapter.

The invention claimed is:

1. A field-assembled optical connector preventing bending of an optical fiber, the optical connector comprising:
   an inner sleeve module;
   a connector frame 6 configured to house the inner sleeve module; and
   a cable boot 9 coupled to the inner sleeve module to protect a sheath of the optical fiber,
   wherein the inner sleeve module includes:
   a sleeve body 3 having a sleeve for aligning the optical fiber during optical fusion splicing, at one end thereof, and a threaded portion at the other end thereof;
   an intermediate connector 4 fitted on the sleeve body 3 while approaching toward a portion of the sleeve body to which the sleeve is provided, the intermediate connector having protrusions 4a at right and left surfaces thereof;
   a spring 5 fitted on the threaded portion of the sleeve body 3;
   a fixing ring 2 screwed to the threaded portion of the sleeve body 3 to prevent the spring 5 from disengaging from the sleeve body; and
   a ferrule stub 1 inserted into the sleeve body 3 through the fixing ring 2 to allow the optical fiber provided to the ferrule stub to extend to the sleeve of the sleeve body 3, and
   wherein the cable boot 9 is fixed to the sleeve body 3 and is coupled to the intermediate connector 4 to be movable within a predetermined range.

2. The field-assembled optical connector of claim 1, wherein one end of the connector frame 6 is coupled to the intermediate connector 4 by approaching from a portion of the sleeve body to which the ferrule stub 1 is provided, and a ferrule provided to the ferrule stub 1 is exposed from the other end of the connector frame.

3. The field-assembled optical connector of claim 1, wherein the cable boot 9 includes:
   fixing holes 9a provided to upper and lower surfaces thereof or right and left surfaces thereof; and
   variable slots 9b provided to the upper and lower surface or the right and left surfaces which are different from surfaces to which the fixing holes 9a are provided,
   wherein the sleeve body 3 is fixed to the fixing holes 9a, and the intermediate connector 4 is movably coupled to the variable slots 9b.

4. The field-assembled optical connector of claim 3, wherein the sleeve body 3 includes first protrusions 3c fitted into the fixing holes 9a.

5. The field-assembled optical connector of claim 3, wherein the intermediate connector 4 includes second protrusions 4a fitted into the variable slots 9b, and
   each of the variable slots 9b comprises a hole having a size greater than a size of the second protrusion 4a to allow the second protrusion 4a to move in a front-rear direction.

6. The field-assembled optical connector of claim 1, further comprising a boot cap 10 coupled to the cable boot 9 in a screw manner to fix a portion of the cable boot 9 fastened to the optical fiber.

* * * * *